Figure 3:
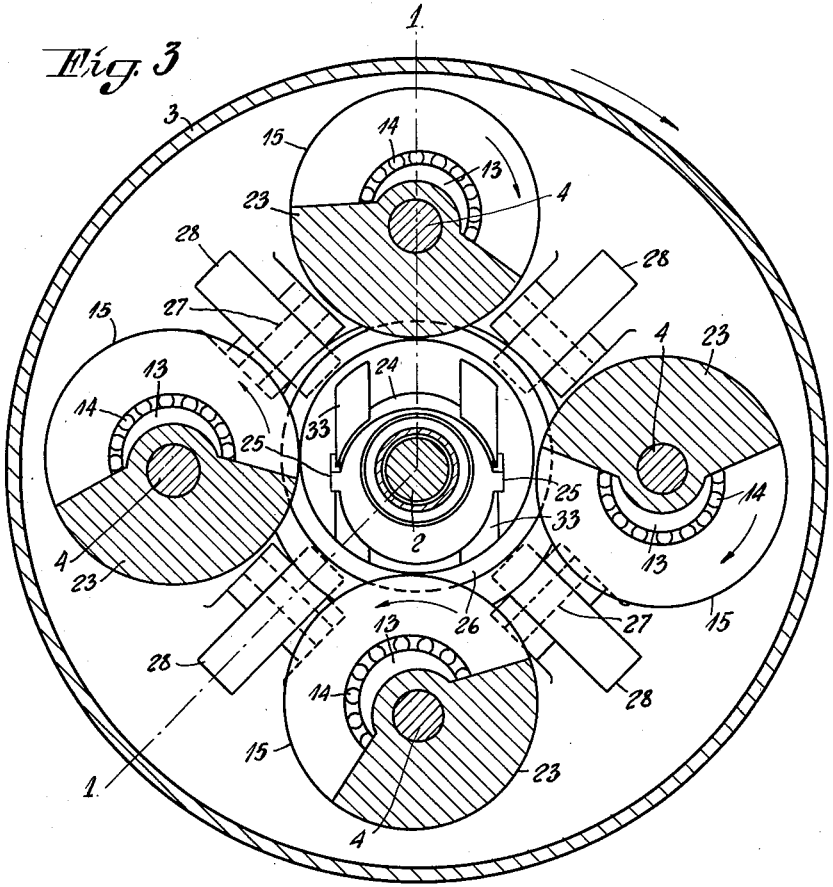

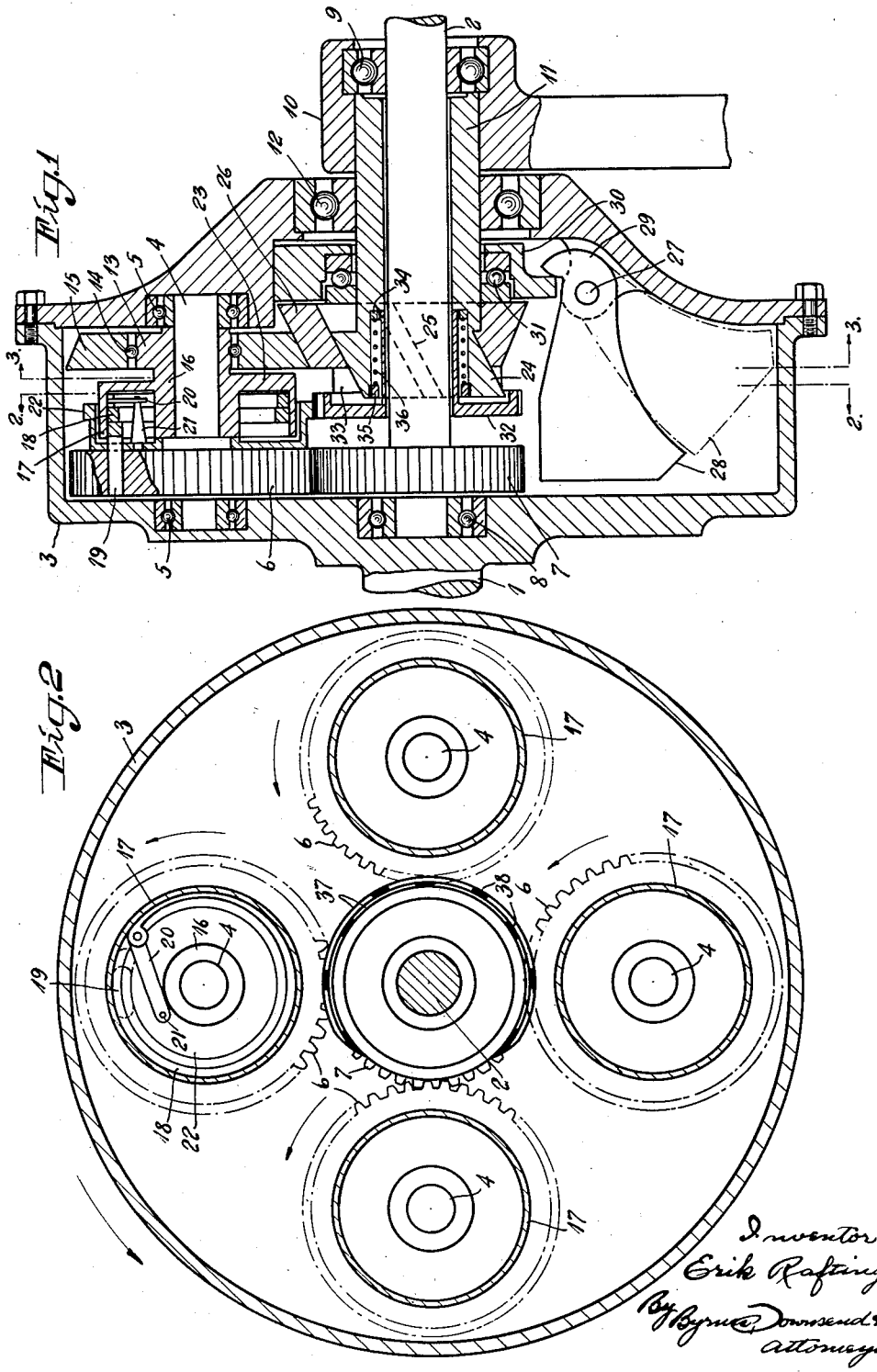

Feb. 19, 1935. E. RAFTING 1,991,820
AUTOMATIC, CONTINUOUSLY VARIABLE GEAR
Filed July 26, 1932 7 Sheets-Sheet 3
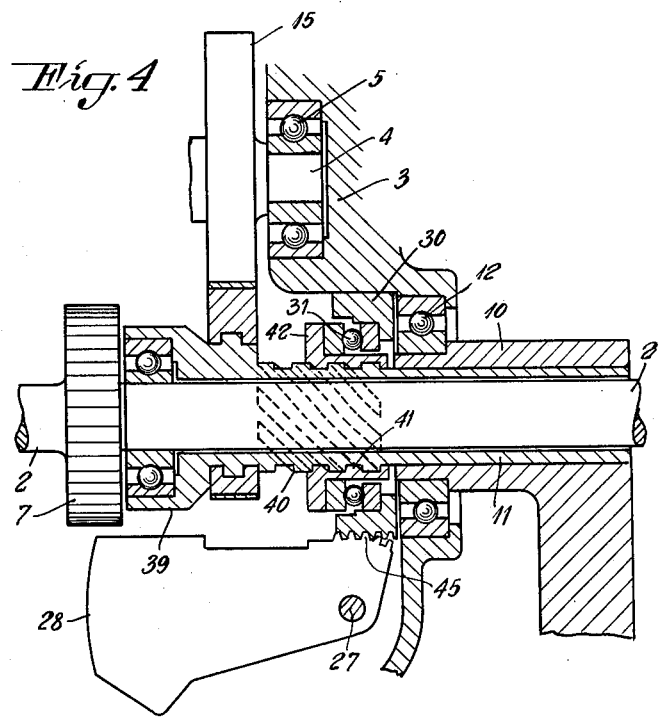
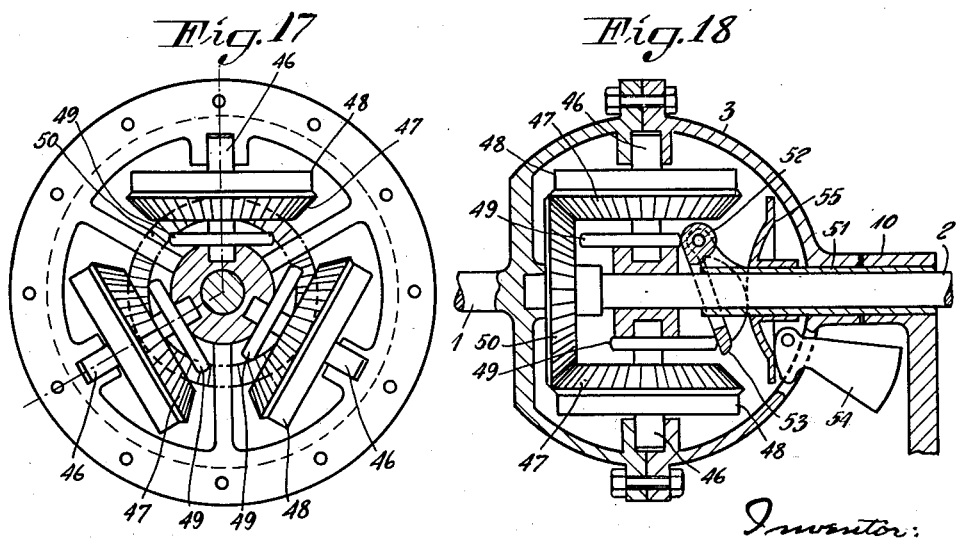
Inventor:
Erik Rafting,
By Byrne Townsend & Potter
Attorneys.

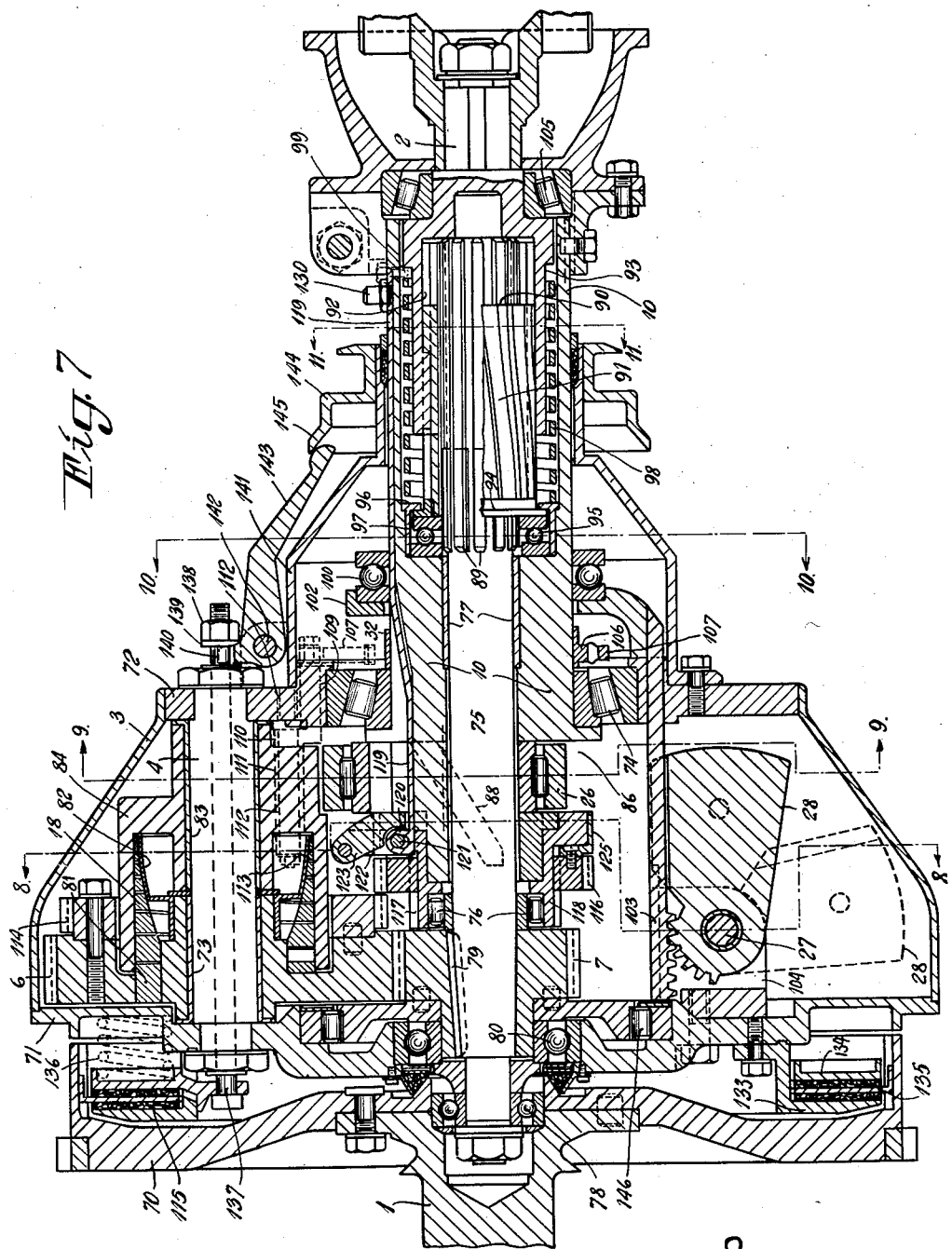

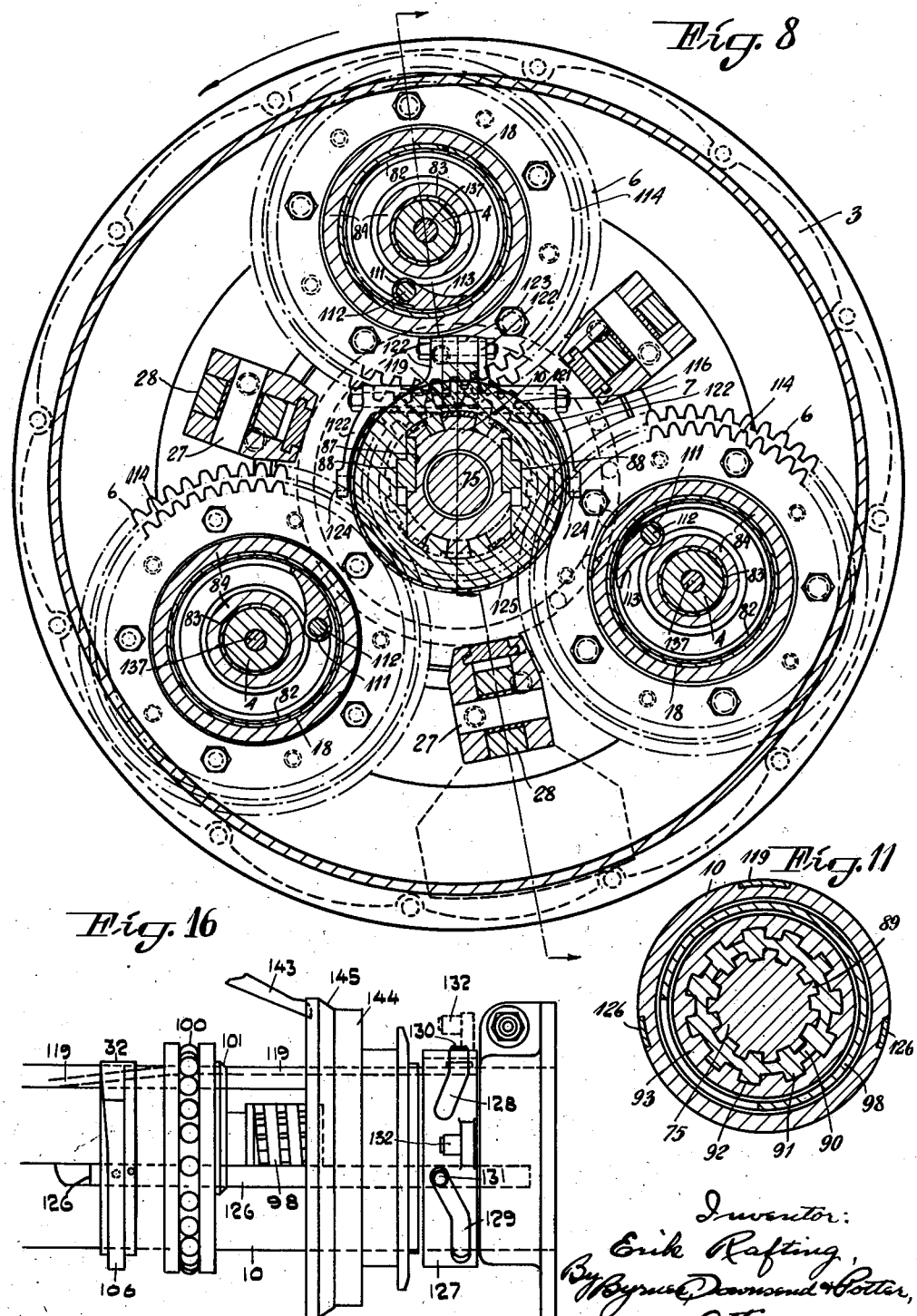

Feb. 19, 1935. E. RAFTING 1,991,820
AUTOMATIC, CONTINUOUSLY VARIABLE GEAR
Filed July 26, 1932 7 Sheets-Sheet 6
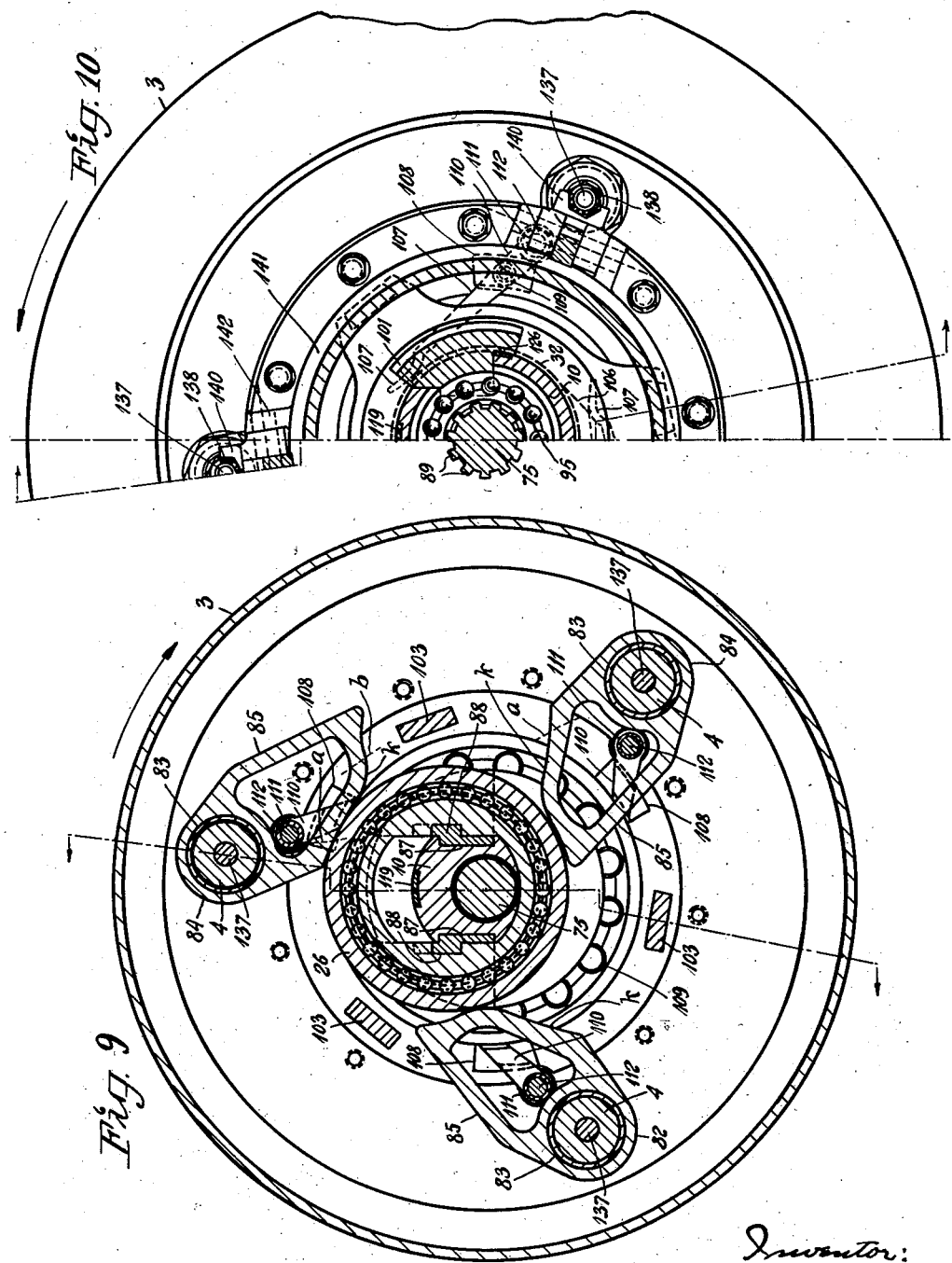

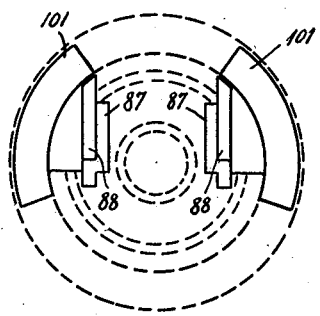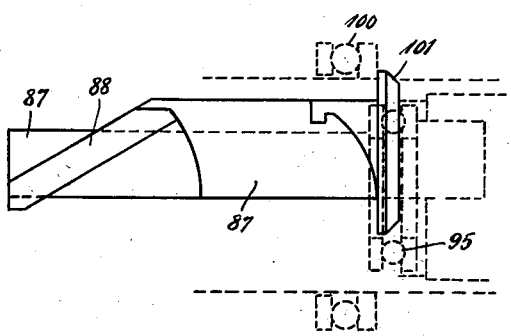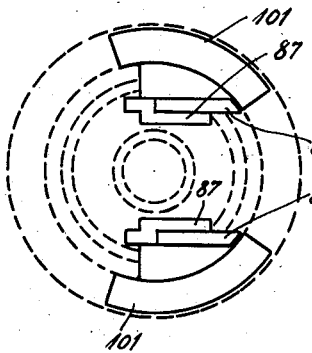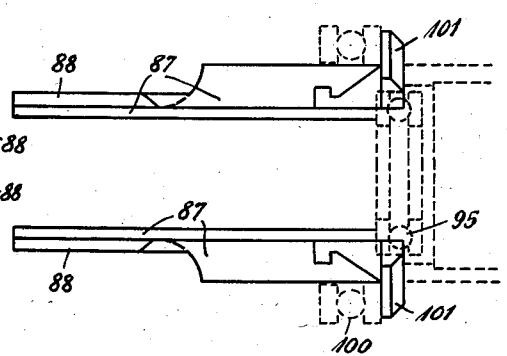

Patented Feb. 19, 1935

1,991,820

UNITED STATES PATENT OFFICE 1,991,820

AUTOMATIC, CONTINUOUSLY VARIABLE GEAR

Erik Rafting, Stockholm, Sweden, assignor of one-half to Aktiebolaget Radius, Stockholm, Sweden, a joint-stock company of Sweden Application July 26, 1932, Serial No. 624,801 In Sweden July 29, 1931

24 Claims. (Cl. 74—113)

The present invention refers to an automatic, continuously variable gear between a driving and a driven shaft of the type where a sun and planet wheel gear or a similarly acting crank system is comprised as a power transmitting element between the shafts.

The invention, which is particularly intended to be applied in motor driven vehicles, such as motor cars and the like, has for its object in accordance with various conditions of load to keep the motor at the ideal and most economical number of revolutions and to prevent motor stops by reason of too great or irregular loads.

The invention consists substantially in that the planet wheels comprised in the sun and planet wheel gear, or the cranks corresponding thereto, are arranged to cooperate, through a releasable clutch connected to said planet wheels or cranks, with members which in dependence of the load and number of revolutions either permit a free or only a partially free rotation of the planet wheels or cranks about their own center, or prevent such rotation entirely, so that either free wheeling, various ratios of gear, or direct drive between the shafts is effected.

According to one embodiment of the invention, the members adapted to control the rotation of the planet wheels or cranks may be formed or arranged in such a manner that the ratio of gear between the shafts is limited downwardly, before the position of free wheeling has been reached, preferably so that the lowest ratio of gear between the shafts will be about 1:3, corresponding to the first gear ordinarily used in the operation of automobiles.

The arrangement may preferably be so constructed that under non-operative conditions said members are automatically adjusted into a position corresponding to said lowest gear, for instance through the action of a spring or springs or the like.

By such downward limitation of the ratio of gear, whereby obviously automatic adjustment for free wheeling is excluded, more quiet operation and shorter oscillations of the said control members with their appertaining clutches are obtained. Moreover, the members transmitting the motion from the gear, such as the propeller shaft, the differential gear and the driving shafts for the rear wheels in an automobile, can be made more slender than with an unlimited ratio of gear down to free wheeling, in which latter case the strains may become considerable.

Figure 6:
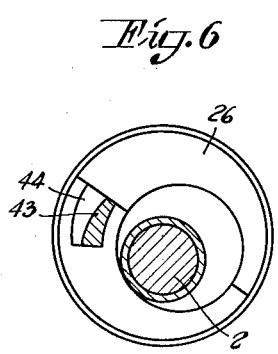
Figure 5:
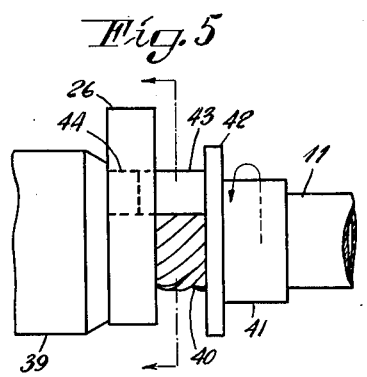

A few embodiments of a gear according to this invention are illustrated in the accompanying drawings. Fig. 1 is an axial section of the gear according to one embodiment. Fig. 2 is a cross-section thereof on line 2—2 in Fig. 1, viewed in the direction of the arrows, from right to left, and Fig. 3 is a cross-section thereof on line 3—3 in Fig. 1, viewed in the direction of the arrows, from left to right. Figs. 4, 5 and 6 show details of a similar gear according to a modified embodiment. Figs. 7–16 show a further embodiment of the arrangement. Fig. 7 is an axial section of the arrangement. Fig. 8 is a cross-section thereof on line 8—8 in Fig. 7, viewed in the direction of the arrow. Fig. 9 is a second cross-section of the same on line 9—9 in Fig. 7, viewed in the direction of the arrow. Fig. 10 is a third cross-section on line 10—10 in Fig. 7, viewed in the direction of the arrow. Fig. 11 is a fourth cross-section of the arrangement on line 11—11 in Fig. 7, viewed in the direction of the arrow. Figs. 12 and 13 represent details of guides for the control of the centric or eccentric adjustment of a central eccentric, viewed from the end and the side respectively. Figs. 14 and 15 show the same guides viewed from the end and from above respectively. Fig. 16 is an elevation of a portion of the arrangement, illustrating some adjusting members. Figs. 17 and 18 show a cross-section and an axial section respectively of a gear with bevel wheels in the sun and planet gear.

In the embodiment shown in Figs. 1–3, 1 designates a driving shaft, such as the motor shaft in an automobile, and 2 is a driven shaft, such as the propeller shaft of the automobile. Connected to the driving shaft 1 is a fly wheel 3 formed into a casing, in which the planet wheels 6 are rotatably mounted by means of shafts 4 and ball bearings 5. The planet wheels, which are rigidly connected with their shafts 4, engage the central sun wheel 7 connected to the shaft 2, which is rotatably mounted, by means of ball bearings 8 and 9, in the fly wheel 3 as well as in a rigid frame 10, the fly wheel 3 being also mounted in said frame, or in a sleeve-shaped part 11 rigidly connected therewith, by means of a ball bearing 12.

Rotatably connected with each planet wheel shaft 4 is an eccentric disk 13, which is termed the planet eccentric hereinbelow, on which an external conical ring 15 is freely rotatable by means of a ball bearing 14. The hub portion 16 of the planet eccentric 13 is formed into a cylindrical sleeve 17 having a clutch provided at the inner side thereof, said clutch consisting in known manner of a helically shaped band 18 of a cross-section increasing successively from the one end to the other, the larger end being rigidly connected with the appertaining planet wheel 6 through a pin 19, while the smaller end of said band is connected, through a link 20 and a pin 21, with a releasing disk 22 freely rotatable within the limits required for the locking and disengagement of the clutch. The hub portion 16 of the planet eccentric is also formed into an eccentrically disposed balance weight 23 located substantially in the direction of the shortest radius of the eccentric and symmetrically with respect to the same.

The previously mentioned rigid sleeve 11 serving as a support for the carrying bearing 12 of the fly wheel, in which sleeve the driven shaft 2 is adapted to rotate freely, is formed at its inner end into a cylindrical body 24, which is cut off obliquely and the axis of which forms an angle, to the central axis of rotation, and which body is provided on the outside, at diametrically opposed places, with two parallel fillets 25 extending parallel to said oblique axis. On the said body 24 and guided by said fillets 25 is displaceably arranged an externally conical ring 26, termed the central eccentric hereinbelow, said ring having the same taper as the planet eccentric rings 15 and bearing on the latter. Such bearing is supported by the balance weights 23 formed on the planet eccentrics 15, said weights having a tendency, by reason of some excess weight, during the rotation of the fly wheel to swing outwardly and to turn a portion of the planet eccentric of the greater radius inwardly toward the central eccentric.

The position of the conical eccentric 26 in relation to the axis of rotation of the gear is determined, first, by the load on the driven shaft 2, which by reason of their gear wheels and the planet eccentrics 13, 15 has a tendency to displace the central eccentric 26 in a direction from left to right in Fig. 1, that is to say into an eccentric position, and, second, by the number of revolutions of the driving shaft, said number of revolutions acting in the opposite direction and tending to displace the central eccentric into a centric position, as will be described hereinafter.

For the latter purpose weights 28 are swingably arranged about studs 27 in the fly wheel 3, said weights acting as levers, the shorter arms 29 of which act upon a supporting ring 30 axially displaceable in the fly wheel and rotating therewith, said ring actuating an axial ball bearing 31 provided therein, which ball bearing is pressed at the rotation of the fly wheel against the central eccentric 26 on account of the centrifugal action of the weights 28.

Moreover, there is arranged about the shaft 2 a cam disk 32 which does not participate in the rotation, and which bears with abutments 33 on the central eccentric 26. The cam disk 32 is provided with a sleeve-shaped hub extending into the body 24 and provided at its inner end with a ring nut 34, between which and a second ring nut 35 screwed in at the end of the body 24 there is arranged a helical spring 36 pressing the cam disk 32 with the abutments 33 against the central eccentric. The cam disk will thus follow the central eccentric in the displacement thereof in the one and the other direction, the spring 36 then also aiding toward keeping the supporting ring 30 pressed against the weight levers through the agency of the cam disk, the central eccentric and the axial ball bearing.

The cam disk 32 also has for its object in the rotation of the fly wheel to impart a turning impulse to the releasing disks during a portion of the revolution, in order to release the locking members 18 from engagement with the planet eccentric sleeves 17 through the agency of the link 20 and to thus release the planet wheels 6. For this purpose an elastic or resilient track is arranged on the outer circumference of the cam disk for about 2/3 thereof, said track having such a diameter that it will touch the outer track of the releasing disks 22, which results in turning of the releasing disks, whereby the clutches are disengaged. The elastic track of the cam disk, which is provided to give a soft and effective contact for the releasing disks, comprises two bands 37 of steel or some other suitable metal, the two bands being secured to the outer edge of the cam disk for about 2/3 of the circumference, with an intermediate space between the bands and between the inner band and the cam disk. Suitably spaced in these intermediate spaces are supporting blocks 38, so that the resiliency will be distributed as uniformly as possible. The clutches 18 may also be so arranged as to be locked when the releasing disks 22 make contact with cam disk 32, the same being thus released when such contact does not occur.

The mode of operation of the gear is as follows.

When the fly wheel 3 is brought into movement and the secondary shaft 2 with the sun wheel 7 makes a small resistance, the planet wheels 6 will roll about the sun wheel. Now, if nothing prevents the planet wheels from turning about their own center, the planet wheels thus circling freely about the sun wheel, the latter will stand still with the secondary shaft, which is equivalent to free wheeling.

On the other hand, if the planet wheels are in a certain degree prevented from turning about their own center, the sun wheel is compelled in the same degree to participate in the rotation. And, if the planet wheels are prevented altogether from turning, the sun wheel must follow in the movement in its entirety, which is equivalent to direct drive. In this arrangement, it is possble to bring about such a gradually increasing hindrance to the rotation of the planet wheels about their own center through the displacement of the central eccentric 26 toward the center of rotation.

When the central eccentric 26 is displaced outwardly into its outermost position, Figs. 1 and 3, it is displaced out of the center to the same extent as the planet eccentrics 13, 15, the shortest radius of which is opposite the longest radius of the central eccentric, and vice versa. During the greater portion of the half revolution commencing at the longest radius of the central eccentric 26 and ending in the direction of the rotation (see the arrows) at the shortest radius, the planet wheels 6 and the planet eccentrics 13 are locked together by the clutches 18. During the second half revolution the clutches are released, that is to say, the planet wheels 6 and the planet eccentrics 13 move freely relatively to each other.

While the fly wheel 3 is making the first half revolution, the planet wheels 6 and the planet eccentrics 13 also turn half a revolution. The increasing length of radius of the planet eccentrics 13 corresponds to the decreasing length of radius of the central eccentric 26. In this position there is nothing that prevents rotation of the planet wheels 6 about their own center-free wheeling.

Now, if the number of revolutions of the fly wheel 3 is increased, the weights 28 urge outwardly through the centrifugal force and turn about the studs 27 and press the arms 29 harder up against the ring 30. The pressure is transferred over the axial ball bearing 31 to the central eccentric 26, which is then displaced more or less inwardly toward the center. When the central eccentric will now be less eccentrically displaced, it does no longer correspond to the eccentricity of the planet eccentrics. Thus the latter can swing inwardly toward the center only for a portion thereof during the first half revolution, and the planet wheels, which are locked together by the clutches with the planet eccentrics, consequently cannot turn half a revolution, but compel the sun wheel partly to participate in the rotation.

Through the displacement of the central eccentric more or less toward the center the possibility of the planet wheels turning about their own center is thus varied.

When the central eccentric has been displaced so far as to occupy a central position, the planet wheels and the eccentrics cannot turn at all about their own center, the sun wheel 7 with the shaft 2 being then entrained in its entirety, corresponding to direct drive.

The cam disk 32 is now displaced axially so far that the contact with the releasing disks 22 entirely ceases, the clutches 18 then being locked all around the whole of the revolution. Everything within the fly wheel is standing still at joint rotation with the same.

It is thus the number of revolutions of the motor (the centrifugal force of the weights 28) which tends to bring or keep the central eccentric 26 in a centric position. It will be seen from Fig. 1 that the outer track of the planet eccentrics is conical and bears against the likewise conical track of the central eccentric. From this it follows that upon an increased pressure (tooth pressure) from the planet eccentrics the central eccentric is compelled to slide away and to be displaced eccentrically. Thus there will be a balance betwen these two forces—the number of revolutions of the motor and the tooth pressure or the resistance of the automobile—which results in a coupling which is always suitable with respect to the output of the motor.

The embodiment shown in Figs. 4–6 differs from that according to Figs. 1–3 substantially only with respect to the adjustment of the central eccentric. Here, the eccentric 26 is, the same as the planet eccentrics 15, made entirely cylindrical, and is axially guided, while being rotatably arranged on an enlarged portion 39 of the stationary sleeve 11 surrounding the propeller shaft 2. This sleeve 11 is provided at the portion next to the enlarged portion 39, with threads 40 of a great pitch, on which runs a sleeve or nut 41 provided with corresponding threads. This nut is provided at the one end with a flange 42, between which and the supporting ring 30 rotating with the casing 3 is arranged an axial ball bearing 31. The flange 42 of the nut is provided with a projection 43 engaging into a corresponding recess 44 in the central eccentric 26, so that the latter is entrained in the rotation of the nut, the projection 43 being at the same time displaced axially in the recess or opening 44. As will be seen from Fig. 6, said opening 44 has a greater extension in a radial direction than the projection 43, so that the relative radial displacement between the projection 43 and the eccentric 26 necessitated by reason of the eccentricity is rendered possible when the eccentric 26 turns from an eccentric into a centric position.

The axial displacement of the supporting ring 30 and the adjustment, in the present case the turning, of the central eccentric 26 caused thereby is effected here, as in the embodiment according to Figs. 1–3, through the centrifugal weights 28 pivotally arranged about the studs 27 in the casing 3. Here, the centrifugal weights are provided with a toothed rim 45 arranged concentrically about the pivot 27, said toothed rim engaging a corresponding series of teeth on the outer circumference of the supporting ring 30, said series of teeth extending at right angles or obliquely to the direction of the axis. In this manner, the weights 28 will be positively guided mutually.

Otherwise, the effect of the gear according to Figs. 4–6 is the same as in the embodiment according to Figs. 1–3, in that the position (here the angular position) of the central eccentric 26, which is dependent on the conditions of load and the number of revolutions, determines the degree of the turning movement of the planet eccentrics 15 for every first half revolution and thus the ratio of gear, as above described.

In the embodiment according to Figs. 7–16, 1 denotes the driving shaft, such as the motor shaft in an automobile, and 2 is the driven shaft, which here forms a part of a so-called universal joint. The motor shaft 1 is rigidly connected with a fly wheel 70, which may be coupled through an ordinary lamination coupling 115 to a casing surrounding the various parts of the gear, said casing comprising the covering 3 as well as two lateral shields 71 and 72. These shields are kept together by three longitudinal rigid shafts 4, on which the planet wheels 6 are mounted by means of bushings 73 so as to be freely rotatable.

The shield 72 is mounted by means of a conical roller bearing 74 on a fixed frame or stator 10. A driven intermediate shaft 75 is adapted to run freely within this stator, the same being mounted on a roller bearing 76 as well as on a journal bearing 77. The inner end of the intermediate shaft 75 is carried by a ball bearing 78 which is centrally arranged in the fly wheel 70. Adjacent to this ball bearing the intermediate shaft is rigidly connected by means of a key 79 to a small gear wheel 7 constituting the central or sun wheel of the sun and planet wheel gear, said sun wheel being in engagement with the planet wheels 6. Arranged on the hub portion of the sun wheel is a ball bearing 80 carrying the inner shield 71. Secured to each one of the planet wheels 6 by means of pins 81 is a locking spring 18 of the type above described, said spring being connected with its outer smaller end to a sleeve 82 surrounding the hub portion of the planet wheel on which it is rotatably mounted. The cylindrical outer side of the locking spring 18 is ground into a locking drum 84 which is freely rotatable on a bushing 83 on the shaft 4, and in which locking drum the spring is adapted to rotate when it is free to do so. The locking drum 84 is formed at the bottom end into an eccentrically arranged arm or cam 85, Fig. 9, the wave-shaped inner surface of which bears on the adjustable central eccentric 26. The latter consists of a roller bearing, and the inner side of the inner ring of this bearing is shaped in accordance with the stator 10 which is flattened on two opposite sides, and, consequently, said inner ring cannot turn relatively to the stator. On the other hand, the outer ring of the bearing is freely rotatable. At the position of the central eccentric 26, the stator is provided on its lower side with a recess 86 Fig. 7, so that the eccentric may be displaced upwardly into an eccentric position while maintaining its position in the axial direction.

To control the different displacements of the central eccentric into and from the centric position, there are provided two axially displaceable guides 87 in the sides of the stator, said guides being shown in detail in Figs. 12-15. The guides are provided on the outside with oblique fillets 88, for which corresponding oblique slots are provided in the inside of the ring of the central eccentric. By displacement on the guides 87 the central eccentric may thus be adjusted into a centric and more or less eccentric position. This displacement takes place in the one direction into an eccentric position under the influence of the load on the driven shaft, and in the other direction into a centric position under the influence of the number of revolutions of the motor shaft, as will be described more fully hereinbelow.

The intermediate shaft 75 is provided at its outer end with axially extending fillets or bars 89 arranged to slide in corresponding slots on the inside of a sleeve 90 surrounding the shaft. This sleeve is provided on the outside with obliquely disposed fillets 91 forming a sharply rising thread which, in turn, slides in corresponding slots 92 on the inside of a second sleeve 93 which is rigidly connected with the driven shaft 2.

The intermediate sleeve 90 is provided at the inner end with an annular flange 94 bearing against the one race of an axial ball bearing 95 which is axially displaceable in the stator 10, the other race of said bearing being supported against the guides 87, Figs. 7 and 9. Bearing on the outside of the annular flange 94 is an annular flange 96 of a sleeve 97 surrounding the ball bearing races. Inserted between the outside of the last-mentioned annular flange 96 and pins 99 screwed into the stator is a helical spring 98, the object of which is to displace the sleeve 97 and the guides 87, 88 into the inner position, as shown in Fig. 1, when the car and the whole gear are brought to a still-stand, the gear being then adjusted for the lowest gear when the car is again to be started.

To displace the guides 87, 88 in a direction from left to right in Fig. 7 and to thus effect adjustment of the central eccentric 26 into a centric or more or less centric position there is displaceably arranged on the stator 10 a second axial ball bearing 100, the one race of which bears against radial projections 101 on the guides, Figs. 13-16, while its other race is arranged in a ring 102 freely surrounding the stator 10, said ring being connected with three racks 103 axially displaceable through openings in the lateral shield 72, said racks being guided at their inner end by blocks 104 secured to the lateral shield 71. These racks engage corresponding teeth on centrifugal weights 28 swingably arranged about studs 27 in the blocks 104. According to the number of revolutions these weights tend to displace the guides 87, 88, through the medium of the racks 103, the ring 102 and the axial ball bearing 100, in a direction from left to right in Fig. 7, thus involving a reduction in the eccentricity of the central eccentric 26.

As stated, the load on the driven shaft 2 acts in the opposite direction, the same on an increase of the load displacing the axial ball bearing 95 and the guides 87, 88 through the sleeve 90 under the influence of the oblique fillets 91, in a direction from right to left in Fig. 7, corresponding to an increase of the eccentricity of the central eccentric 26.

Obviously, the ball bearing 100 with the ring 102 and the racks 103 as well as the weights 28 are also entrained in this movement, the said weights then swinging inwardly.

A certain balance will always be maintained between the load and the centrifugal force of the weights 28 depending on the number of revolutions, so that the central eccentric 26 will take the position which is the most suitable with respect to the operating conditions and will thus bring about the most suitable ratio of gear between the shafts 1 and 2 for the time being. The latter shaft is mounted together with the sleeve 93 connected thereto in a conical roller bearing 105 provided in the frame 10.

To control the clutches 18, 84, to which the planet wheels 6 are to be coupled during certain periods, a cam ring 32 is displaceably but not rotatably arranged on the stator 10, the cam 106 of said cam ring extending over ⅓ of the circumference. Tangentially directed arms 107, Figs. 7, 9 and 10, bear with the one end thereof on said cam ring and are connected with pins 109 extending axially through openings 108 in the lateral shield 72, said pins being provided with a part 110 extending at an angle thereto and rigidly connected with a pipe-shaped part 111, which is rotatable about a pin 112 secured in the shield 72 and extends through a corresponding curved arm 85 into the locking drum 84, where the same is formed into a clamping jaw 113 adapted to be pressed against the sleeve 82 in order thus to press the weak end of the locking spring 18 against the inner surface of the locking drum, so that said inner surface and the appertaining planet wheel 6 are coupled together. This coupling is maintained while the arm 107 is in contact with the cam 106 on the cam ring 32, that is to say during one third of each revolution.

In the present embodiment there is also provided a reverse gear in such a manner that with each one of the planet wheels 6 is rigidly connected a somewhat smaller gear wheel 114, which on reversed running is brought into engagement with a central wheel 116, which is axially displaceable but prevented through fillets 117 or the like from turning on a sleeve 118 rigidly connected with the stator 10, said sleeve also forming the outer ring for the roller bearing 76. If the casing 3 is caused to rotate after engagement has been effected between the wheels 114 and 116 through an axial displacement of the latter wheel 116, all planet wheels 6 are compelled to rotate at a speed involved by the circling of the reverse planet wheels 114 about the stationary central wheel 116. Now, as the gear planet wheels 6 are greater than the reverse planet wheels 114, the intermediate shaft 75 is caused to rotate backwards, in spite of the motor shaft 1 with the fly wheel 70 and the covering 3 rotating forwardly.

The control of the reverse gear is effected by means of an axially displaceable guide 119 provided in the upper side of the stator 10, said guide being formed at its inner end into a loop 120 surrounding a pin 121 of a forked arm 122, which is pivotally connected at its upper end with an arm 123 projecting from the stator, and which is pivotally connected with its shanks, by means of diametrically opposed pins 124, to a ring 125 which is axially displaceable on the sleeve 118 and rigidly connected with the central wheel 116.

At reversed running the cam ring 32, 106 controlling the clutches 18, 84 is to be brought out of contact with the arms 107. To this end the cam ring is connected with guides 126 provided in the sides of the stator and adapted to be axially displaceable, Figs. 10, 11 and 16. These guides as well as the guide 119 arranged for the control of the reverse gear wheel 116 are controlled by means of a common member consisting of a sleeve 127 rotatable about the rear part of the stator, said sleeve being provided with curved slots 128 and 129 respectively engaged by pins 130 and 131 connected with the guide 119 and the guides 126 respectively, Fig. 16. Said curved slots 128, 129 are, as will be seen from the drawings, shaped in such a manner that when the sleeve 127 is turned to make the reverse gear operative, the cam ring 32, 106 will first be displaced to the right out of contact with the clutch arms 107, whereupon the guide 119 with the reverse wheel 116 is displaced to the left to be coupled to the reverse planet wheels 114. Upon disengagement of the reverse gear the succession will be the opposite, so that the reverse gear wheels are first brought out of engagement with each other, whereupon the cam ring 32, 106 is brought into position for the clutch arms 107. Turning of the sleeve 127 may be effected by means of some arbitrary external operating member, such as a lever or the like engaging a pin 132 or the like connected with the sleeve.

The lamination coupling 115 comprises three main parts, i. e. an external ring 133 rigidly connected with the shield 71 and rotating together with the same and with the covering 3, a ring 134 rotating likewise together with the shield and the covering while being axially adjustable relatively to these parts, and a ring 135 rigidly connected with the fly wheel 70 and located between the rings 133, 134. These rings are kept normally pressed against each other by means of a number of comparatively powerful helical springs 136 (only one of which is visible in Fig. 7) inserted between the shield 71 and the movable coupling ring 134. This coupling ring 134 is connected with three bolts 137 extending centrally through the planet wheel shafts 4 in which they are axially displaceable, the free ends of said bolts extending outside the shield 72, where they are provided with a washer 139 retained by means of a nut 138. Bearing on each one of these washers is a forked arm 140 of a double-armed lever, which arm partly surrounds the bolt 137. Said double-armed lever is swingable about a pin 142 mounted on a part 141 of the covering, and the longer, inwardly bent arm 143 of the lever is arranged to be actuated by a partly conical operating sleeve 144 which is axially displaceable on said part of the covering. When said sleeve is moved with the conical part 145 from right to left in Figs. 7–16, the longer lever arms 143 are swung inwardly toward the part 141 of the covering which is here conically shaped, a pull being thus produced in the bolts 137 and the coupling ring 134 being moved in a direction from left to right against the action of the springs 136, so that free wheeling is brought about.

The effect of the gear device described is the same, in principle as that indicated above, that is to say, the central eccentric 26 is caused, depending on the load and the number of revolutions, to take corresponding positions, i. e. a centric position at a greater number of revolutions and a normal load, where the cam arms 85 connected with the locking drums 84 and thus also the planet wheels 6 are not permitted to perform any turning movement during the locking periods, with the result that the connection between the planet wheels and the sun wheel 7 is rendered rigid, corresponding to direct drive, when all movable parts of the gear rotate as a unit, without any mutual movement, or, when the load exceeds a certain limit, a more or less eccentric position, when swinging of the arms 85 with the locking drums 84 and the planet wheels 6 is permitted within certain limits varying with respect to the eccentricity, corresponding to various ratios of gear. The lowest gear is obtained when the central eccentric 26 occupies its most eccentric position, Figs. 7 and 9, where the arms 85 are permitted during the sliding movement toward the central eccentric to turn within the greatest angle represented by the dotted lines $a$ and $b$. The curve $k$ of the arms 85 which rolls or rocks toward the central eccentric is in the present form of embodiment shaped in such a manner that the possible turning movement of the arm 85 corresponds to a ratio of gear between the shafts of about 1:3. Here, no free turning of the arms is possible, similar to the free turning of the planet eccentrics in the arrangement according to Figs. 1–3 for the purpose of free wheeling.

Inserted between the latter shield 71 and the central wheel 7 is a roller lock 146 preventing the driven shaft from turning at a greater speed than the casing when braking is effected with the motor.

In the embodiment according to Figs. 17 and 18, 1 designates the motor shaft, as before, 3 is the casing or fly wheel connected thereto and receiving the sun and planet wheel gear, and 2 is the propeller shaft and 10 the rigid frame. In the casing 3, shafts 46 are mounted at an angle of 120° relatively to each other, the conical planet wheels 47 being rotatably mounted on said shafts. The planet wheels are provided with locking drums 48 between which and the corresponding shafts 46 is arranged a locking connection of the same construction as in the embodiment according to Figs. 1–3. Rigidly connected with the shafts 46 are eccentrics 49 (corresponding to the planet eccentrics 15 in the embodiments according to Figs. 1–3 and 4–6). The planet wheels 47 are in engagement with the conical sun wheel 50, which is rigidly connected to the propeller shaft 2 rotatably mounted in the casing 3 and the frame 10. At the inner end of a stationary sleeve 51 surrounding the propeller shaft (corresponding to the sleeve 11 in the previous embodiments) there is swingably arranged a disk 53 about a pin 52, corresponding to the previously described central eccentric 26 and adapted to cooperate with the planet eccentrics 49. The position of this disk 53, that is to say its position relatively to the axis of rotation (1—2), is determined in part by the pressure from the planet eccentrics 49 (the load), and in part by the action of centrifugal weights 54 pivotally mounted in the casing 3 (the number of revolutions). These weights act upon a curved plate 55 displaceable on the stationary sleeve 51, said plate in turn actuating the swingable central disk 53.

The planet eccentrics 49 tend to adjust the disk 53 into an inclined position relatively to the axis of rotation, while the weights 54 tend to adjust the same at right angles to said axis. At a certain inclination of the central disk 53, free turning of the planet eccentrics 49 and of the planet wheels 47 coupled thereto is permitted, which corresponds to free wheeling. At a smaller inclination of the disk 53, the planet eccentrics and thus the planet wheels can turn in part only for every first half revolution, the sun wheel 50 and the propeller shaft 2 being then entrained in a corresponding degree, whereas, when the disk 53 occupies a position at right angles to the axis of rotation, the planet eccentrics at the planet wheels are entirely prevented from turning, corresponding to direct drive between the shafts 1 and 2 in the same manner as in the embodiments above described.

What I claim is:—

1. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central member adjustable relatively to said latter shaft, means responsive to the rotary speed of one shaft and to the load on the driven shaft for adjusting said member, a releasable one-way clutch for locking each of said planetary pinions against rotation about its own axis, means for releasing each clutch, and means cooperating with said member for controlling said releasing means, thereby to control the rotation of said planetary pinions relatively to said sun wheel.

2. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central member adjustable relatively to said latter shaft, means responsive to the rotary speed of one shaft and to the load on the driven shaft for adjusting said member, a releasable one-way clutch for locking each of said planetary pinions against rotation about its own axis, means for automatically locking said one-way clutches to their corresponding planetary pinion during part of each revolution of the first mentioned shaft, means for releasing each clutch, and means cooperating with said member for controlling said releasing means, thereby to control the rotation of said planetary pinions relatively to said sun wheel.

3. An automatic continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of one shaft and to the load on the driven shaft for adjusting said member, a releasable one-way clutch for locking each of said planetary pinions against rotation about its own axis, and an eccentric device for each of said pinions and cooperating with said central eccentric device to control the associated clutch, thereby to control the rotation of said planetary pinions relatively to said sun wheel.

4. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of one shaft and to the load on the driven shaft for adjusting said member, a releasable one-way clutch for locking each of said planetary pinions against rotation about its own axis, means for automatically locking said one-way clutches to their corresponding planetary pinion during part of each revolution of the first mentioned shaft, and an eccentric device for each of said pinions and cooperating with said central eccentric device to control the associated clutch, thereby to control the rotation of said planetary pinions relatively to said sun wheel.

5. An automatic, continuously variable speed gearing for a driving shaft and a driven shaft, comprising an epicyclic gear train the planetary pinions of which are operatively connected to one of said shafts, and the sun wheel of which is secured on the other shaft, a non-rotating central eccentric device radially adjustable relatively to said latter shaft, means responsive to the rotary speed on said first mentioned shaft for moving said central eccentric device towards a centric position, means responsive to the load on said second shaft for moving said central eccentric device towards eccentric positions, a releasable one-way clutch for locking each of said planetary pinions against rotation about its own axis, and an eccentric device for each of said pinions and cooperating with said central eccentric device to control the associated clutch, thereby to control the rotation of said planetary pinions relatively to said sun wheel.

6. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load on said second shaft for moving said central eccentric device towards eccentric positions, a releasable one-way clutch for locking each of said planetary pinions against rotation about its own axis, an eccentric device for each of said pinions and cooperating with said central eccentric device to control the associated clutch, thereby to control the rotation of said planetary pinions relatively to said sun wheel.

7. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central member adjustable relatively to said latter shaft, means responsive to the rotary speed of one shaft and to the load on the driven shaft for adjusting said member, a releasable one-way clutch for each of said planetary pinions in operative connection therewith, and means in operative connection with said member and with said clutches for controlling the rotation of said planetary pinions relatively to said sun wheel, said means for controlling the rotation of said planetary pinions with respect to said sun wheel comprising a releasing disk for each planetary pinion, each disk being rotatable about the axis of its respective pinion, and a centrally arranged non-rotatable cam disk cooperating with said releasing disks to release or engage said clutches.

8. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central member adjustable relatively to said latter shaft, means responsive to the rotary speed of one shaft and to the load on the driven shaft for adjusting said member, a releasable one-way clutch for each of said planetary pinions in operative connection therewith, and means in operative connection with said member and with said clutches for controlling the rotation of said planetary pinions relatively to said sun wheel, said means for controlling the rotation of said planetary pinions with respect to said sun wheel comprising a releasing disk for each planetary pinion, each disk being rotatable about the axis of its respective pinion, and a centrally arranged non-rotatable cam disk cooperating with said releasing disks to release or engage said clutches, said cam disk having a cam extending along not less than one-half the circumference of said cam disk.

9. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central member adjustable relatively to said latter shaft, means responsive to the rotary speed of one shaft and to the load on the driven shaft for adjusting said member, a releasable one-way clutch for each of said planetary pinions in operative connection therewith, and means in operative connection with said member and with said clutches for controlling the rotation of said planetary pinions relatively to said sun wheel, said means for controlling the rotation of said planetary pinions with respect to said sun wheel comprising a releasing disk for each planetary pinion, each disk being rotatable about the axis of its respective pinion, and a centrally arranged non-rotatable cam disk cooperating with said releasing disks to release or engage said clutches, said cam disk having a resilient cam extending along not less than one-half the circumference of said cam disk.

10. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means for automatically moving said central eccentric device towards a centric position under non-operative conditions of the gearing, a one-way clutch for locking each planetary pinion against rotation about its axis, and means including an eccentric device for each clutch and cooperating with said central eccentric device for controlling the respective clutches, thereby to control the rotation of said planetary pinions relatively to the sun wheel.

11. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a releasable one-way clutch for locking each of said planetary pinions against rotation about its own axis, means for automatically moving said central eccentric device towards a centric position under non-operative conditions of the gearing, and an eccentric device for each of said pinions in operative connection with the associated clutch and with said central eccentric device for controlling the rotation of said planetary pinions relatively to said sun wheel.

12. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a releasable one-way clutch for locking each of said planetary pinions against rotation about its own axis, an eccentric device for each of said pinions in operative connection with the associated clutch and with said central eccentric device for controlling the rotation of said planetary pinions relatively to said sun wheel, means for automatically moving said central eccentric device towards a centric position under non-operative conditions of the gearing, and means for automatically locking said one-way clutches to their corresponding planetary pinions during part of each revolution of the first mentioned shaft.

13. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of one shaft and to the load on the driven shaft for adjusting said stationary member, a releasable one-way clutch for locking each of said planetary pinions against rotation about its own axis, means for automatically locking said one-way clutches to their corresponding planetary pinions during part of each revolution of the first mentioned shaft, and an eccentric device for each of said pinions in operative connection with the associated clutch and said central eccentric device for controlling the rotation of said planetary pinions relatively to said sun wheel, said driven shaft including two parts and a lost-motion driving connection coupling said parts to permit relative rotation thereof within predetermined limits.

14. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a releasable one-way clutch for locking each of said planetary pinions against rotation about its own axis, and an eccentric device for each of said pinions in operative connection with the associated clutch and with said central eccentric device for controlling the rotation of said planetary pinions relatively to said sun wheel, said driven shaft including two parts and a lost-motion driving connection coupling said parts to permit relative rotation thereof within predetermined limits.

15. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a releasable one-way clutch for locking each of said planetary pinions against rotation about its own axis, and an eccentric device for each of said pinions in operative connection with the associated clutch and with said central eccentric device for controlling the rotation of said planetary pinions relatively to said sun wheel, said driven shaft including two parts and a lost-motion driving connection coupling said parts to permit relative rotation thereof within predetermined limits, said lost-motion driving connection being in operative connection with the means for moving said central eccentric device towards a centric position and with the means for moving said eccentric device towards eccentric positions.

16. An automatic, continuously variable speed gearing for a driving shaft and a driven shaft, comprising an epicyclic gear train the planetary pinions of which are operatively connected to one of said shafts and the sun wheel of which is secured on the other shaft, a non-rotating central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a releasable one-way clutch for locking each of said planetary pinions against rotation about its own axis, and an eccentric device for each of said pinions in operative connection with the associated clutch and with said central eccentric device for controlling the rotation of said planetary pinions relatively to said sun wheel, said driven shaft including two parts and a lost-motion driving connection coupling said parts to permit relative rotation thereof within predetermined limits, said lost-motion driving connection being in operative connection limits, said last means being in operative connection with the means for moving said central eccentric device towards a centric position and with the means for moving said eccentric device towards eccentric positions, and spring means acting upon said last means for moving said central eccentric device towards a centric position under non-operative conditions of the gearing.

17. An automatic, continuously variable speed gearing for a driving shaft and a driven shaft, comprising an epicyclic gear train the planetary pinions of which are operatively connected to one of said shafts and the sun wheel of which is secured on the other shaft, a stationary central member adjustable relatively to said latter shaft, means responsive to the rotary speed of one shaft and to the load on the driven shaft for adjusting said stationary member, a one-way clutch for each of said planetary pinions in operative connection therewith, means in operative connection with said stationary member and with said clutches for controlling the rotation of said planetary pinions relatively to said sun wheel, a second planetary gear wheel firmly and coaxially secured to each of said planetary pinions and having a less diameter than said pinions, a centrally disposed non-rotatable but axially displaceable gear wheel common to all of said planetary gear wheels, and means for moving said central gear wheel into engagement with said second planetary gear wheel.

18. An automatic, continuously variable speed gearing for a driving shaft and a driven shaft, comprising an epicyclic gear train the planetary pinions of which are operatively connected to one of said shafts and the sun wheel of which is secured on the other shaft, a stationary central member adjustable relatively to said latter shaft, means responsive to the rotary speed of one shaft and to the load on the driven shaft for adjusting said stationary member, a one-way clutch for each of said planetary pinions in operative connection therewith, means in operative connection with said stationary member and with said clutches for controlling the rotation of said planetary pinions relatively to said sun wheel, a second planetary gear wheel firmly and coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, and means for rendering the said one-way clutches inoperative.

19. An automatic, continuously variable speed gearing for a driving shaft and a driven shaft, comprising an epicyclic gear train the planetary pinions of which are operatively connected to one of said shafts and the sun wheel of which is secured on the other shaft, a stationary central member adjustable relatively to said latter shaft, means responsive to the rotary speed of one shaft and to the load on the driven shaft for adjusting said stationary member, a one-way clutch for each of said planetary pinions in operative connection therewith, means in operative connection with said stationary member and with said clutches for controlling the rotation of said planetary pinions relatively to said sun wheel, a second planetary gear wheel firmly and coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, means for rendering the said one-way clutches inoperative, and a common operating member for actuating said last two means.

20. An automatic, continuously variable speed gearing for a driving shaft and a driven shaft, comprising an epicyclic gear train the planetary pinions of which are operatively connected to one of said shafts and the sun wheel of which is secured on the other shaft, a stationary central member adjustable relatively to said latter shaft, means responsive to the rotary speed of one shaft and to the load on the driven shaft for adjusting said stationary member, a one-way clutch for each of said planetary pinions in operative connection therewith, means in operative connection with said stationary member and with said clutches for controlling the rotation of said planetary pinions relatively to said sun wheel, a second planetary gear wheel firmly and coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, means for rendering the said one-way clutches inoperative, and a common operating member for actuating one and then the other of said last two means.

21. An automatic, continuously variable speed gearing for a driving shaft and a driven shaft, comprising an epicyclic gear train the planetary pinions of which are operatively connected to one of said shafts and the sun wheel of which is secured on the other shaft, a stationary central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a one-way clutch for each of said planetary pinions in operative connection therewith, an eccentric device for each of said pinions in operative connection with the associated clutch and with said central eccentric device for controlling the rotation of said planetary pinions relatively to said sun wheel, a second planetary gear wheel firmly and coaxially secured to each of said planetary pinions and having a less diameter than said pinions, a centrally disposed non-rotatable but axially displaceable gear wheel common to all of said planetary gear wheels, and means for moving said central gear wheel into engagement with said second planetary gear wheels.

22. An automatic, continuously variable speed gearing for a driving shaft and a driven shaft, comprising an epicyclic gear train the planetary pinions of which are operatively connected to one of said shafts and the sun wheel of which is secured on the other shaft, a stationary central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a one-way clutch for each of said planetary pinions in operative connection therewith, an eccentric device for each of said pinions in operative connection with the associated clutch and with said central eccentric device for controlling the rotation of said planetary pinions relatively to said sun wheel, a second planetary gear wheel firmly coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, and means for rendering the said one-way clutches inoperative.

23. An automatic, continuously variable speed gearing for a driving shaft and a driven shaft, comprising an epicyclic gear train the planetary pinions of which are operatively connected to one of said shafts and the sun wheel of which is secured on the other shaft, a stationary central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a one-way clutch for each of said planetary pinions in operative connection therewith, an eccentric device for each of said pinions in operative connection with the associated clutch and with said central eccentric device for controlling the rotation of said planetary pinions relatively to said sun wheel, a second planetary gear wheel firmly coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, means for rendering the said one-way clutches inoperative, and a common operating member for actuating said last two means.

24. An automatic, continuously variable speed gearing for a driving shaft and a driven shaft, comprising an epicyclic gear train the planetary pinions of which are operatively connected to one of said shafts and the sun wheel of which is secured on the other shaft, a stationary central eccentric device radially adjustable relatively to said latter shaft, means responsive to the rotary speed of said first mentioned shaft for moving said central eccentric device towards a centric position, means responsive to the load of said second shaft for moving said central eccentric device towards eccentric positions, a one-way clutch for each of said planetary pinions in operative connection therewith, an eccentric device for each of said pinions in operative connection with the associated clutch and with said central eccentric device for controlling the rotation of said planetary pinions relatively to said sun wheel, a second planetary gear wheel firmly coaxially secured to each of said planetary pinions and having a less diameter than said pinions, a centrally disposed non-rotatable but axially displaceable gear wheel common to all of said planetary gear wheels, means for moving said central gear wheel into engagement with said second planetary gear wheels, means for rendering the said one-way clutches inoperative, and a common operating member for actuating one and then the other of said last two means.

ERIK RAFTING.